(12) United States Patent
Kucera et al.

(10) Patent No.: US 10,801,000 B2
(45) Date of Patent: Oct. 13, 2020

(54) AUTOMATED BEER-BREWING SYSTEM AND METHOD WITH BREW CYCLE CONTROL VALVE ARRANGEMENT

(71) Applicant: CM BREWING TECHNOLOGIES, LLC, Tustin, CA (US)

(72) Inventors: Curtis C. Kucera, Temecula, CA (US); Jakob Kucera, Winchester, CA (US)

(73) Assignee: CM BREWING TECHNOLOGIES, LLC, Tustin, CA (US)

( * ) Notice: Subject to any disclaimer, the term of this patent is extended or adjusted under 35 U.S.C. 154(b) by 291 days.

(21) Appl. No.: 15/900,713

(22) Filed: Feb. 20, 2018

(65) Prior Publication Data
US 2018/0245029 A1 Aug. 30, 2018

Related U.S. Application Data

(60) Provisional application No. 62/460,858, filed on Feb. 19, 2017.

(51) Int. Cl.
| | | |
|---|---|---|
| *C12C 13/02* | (2006.01) | |
| *C12C 7/04* | (2006.01) | |
| *C12C 11/07* | (2006.01) | |
| *C12C 7/20* | (2006.01) | |
| *C12C 13/10* | (2006.01) | |

(52) U.S. Cl.
CPC ............... *C12C 13/02* (2013.01); *C12C 7/04* (2013.01); *C12C 11/07* (2013.01); *C12C 7/20* (2013.01); *C12C 13/10* (2013.01)

(58) Field of Classification Search
CPC ..... C12C 13/10; C12C 13/00; C12C 13/02–08; C12C 7/04
See application file for complete search history.

(56) References Cited

U.S. PATENT DOCUMENTS

| | | | | |
|---|---|---|---|---|
| 512,311 | A | * | 1/1894 | Manz ....................... C12C 13/10 99/276 |
| D138,363 | S | | 7/1944 | Giuriati |
| D193,779 | S | | 10/1962 | Walsh et al. |
| D222,505 | S | | 10/1971 | Carr |

(Continued)

FOREIGN PATENT DOCUMENTS

| | | |
|---|---|---|
| CN | 2232724 Y | 8/1996 |
| CN | 2332724 Y | 8/1999 |

(Continued)

OTHER PUBLICATIONS

27 Gallon Fermentor © Williams Brewing: http://www.williamsbrewing.com/27-GALLON-FERMENATOR-P980.aspx; accessed Jun. 18, 2014.

(Continued)

*Primary Examiner* — Matthew P Travers
(74) *Attorney, Agent, or Firm* — Barnes & Thornburg LLP

(57) ABSTRACT

An automated beer-brewing system and method includes plural brewing containers, supply containers, and post-beer brewing containers to bottle the brewed beer and to handle waste fluids and solids. Plural pipes couple the brewing containers to the group of post-beer-brewing containers and beer-brewing containers. Plural brew-cycle control valves are coupled to each of the pipes, to locate all of the control valves in a central region of the system.

4 Claims, 9 Drawing Sheets

(56) References Cited

U.S. PATENT DOCUMENTS

| | | | |
|---|---|---|---|
| 3,962,478 | A | 6/1976 | Hohlbein et al. |
| 4,397,953 | A | 8/1983 | Guazzone et al. |
| 4,754,698 | A | 7/1988 | Naish |
| 4,865,078 | A | 9/1989 | Ensign |
| D337,633 | S | 7/1993 | Drager et al. |
| D346,011 | S | 4/1994 | Hawkins |
| 5,311,811 | A | 5/1994 | Kuzyk |
| 5,906,151 | A | 5/1999 | Firestone et al. |
| 5,925,563 | A * | 7/1999 | Redford ............... C12C 11/003 435/300.1 |
| D479,576 | S | 9/2003 | Wright |
| D528,344 | S | 9/2006 | Mika et al. |
| D530,140 | S | 10/2006 | Macler et al. |
| D541,378 | S | 4/2007 | Sinvani |
| D570,148 | S | 6/2008 | Garman |
| D585,959 | S | 2/2009 | Caron et al. |
| D602,301 | S | 10/2009 | Romandy |
| D623,270 | S | 9/2010 | Fukano et al. |
| D671,650 | S | 11/2012 | Donaldson |
| D685,599 | S | 7/2013 | Miller et al. |
| D720,832 | S | 1/2015 | Shetti et al. |
| D723,316 | S | 3/2015 | Epstein |
| D729,565 | S | 5/2015 | Starr et al. |
| 9,192,883 | B1 | 11/2015 | Blichmann |
| D750,422 | S | 3/2016 | Jurs |
| D810,498 | S | 2/2018 | Westfall et al. |
| D812,953 | S | 3/2018 | Berberet et al. |
| D819,385 | S | 6/2018 | Moore |
| D824,196 | S | 7/2018 | Shin et al. |
| 10,017,722 | B2 | 7/2018 | Glasgow et al. |
| D825,258 | S | 8/2018 | Majka et al. |
| D829,304 | S | 9/2018 | McClauchlan et al. |
| D849,465 | S | 5/2019 | Shin et al. |
| D859,902 | S | 9/2019 | van de Goor |
| 2004/0118737 | A1 | 6/2004 | Welsh et al. |
| 2007/0090644 | A1 | 4/2007 | Pokier et al. |
| 2008/0311262 | A1 | 12/2008 | Blichmann |
| 2010/0018994 | A1 | 1/2010 | Antheil et al. |
| 2010/0303984 | A1 | 12/2010 | Wasmuht et al. |
| 2011/0165421 | A1 | 7/2011 | Schlesinger et al. |
| 2014/0017354 | A1 | 1/2014 | Joseph et al. |
| 2014/0144328 | A1 | 5/2014 | Greene, Jr. et al. |
| 2015/0128809 | A1 | 5/2015 | Hansmann et al. |

FOREIGN PATENT DOCUMENTS

| | | |
|---|---|---|
| CN | 1051799 C | 4/2000 |
| DE | 4205538 A1 | 9/1993 |
| DE | 102004053413 A1 | 5/2006 |
| GB | 271777 A | 6/1927 |

OTHER PUBLICATIONS

Blichmann Engineering, FermenatorTm; http://www.blichmannengineering.com/products/ferminator; © 2013 Blichmann Engineering, accessed Jun. 23, 2014.

Blichmann Engineering, FermenatorTm; Tri-Clamp Models; Operation, Assembly, Maintenance Manuel; F3-TC Owners Manual V4, © 2011 Blichmann Engineering, LLC.

Brouwland, Fermenator Ferment Tank Standard 1581 (42 gal); http://brouwland.com/en/our-products/winemaking/bottles-tanksbarrels/stainless-steel-tanks;cylindroconical-tanks/tanks/d/fermenatorferment-tank-sta . . . ; accessed Jun. 18, 2014.

CF7BBL-JKT-SIDE 7 Barrel Glycol Jacketed Conical Fermenter with Side Manway; https://conical-fermentercom/7-Barrel-GlycolJacketed-Conical-Fermenter.html; © 2009-2014 Stout Tanks & Kettles, LLC, accessed Jun. 18, 2014.

Ss Brewing Technologies; The Brew Bucket 7 Gallon 304 Stainless Steel Fermenter I Ss Brewing Technologies; http://www.ssbrewtech.com/products/brewbucket; accessed Jun. 17, 2014.

Young, Lee W., Authorized Officer, International Searching Authority / U.S. Receiving Office, "Written Opinion of the International Searching Authority" in connection with International Application No. PCT/US2015/041201, dated Oct. 23, 2015, 6 pages.

Young, Lee W., Authorized Officer, U.S. Receiving Office, "International Search Report" in connection with International Application No. PCT/US2015/041201, dated Oct. 23, 2015, 2 pages.

\* cited by examiner

AUTOMATED BEER-BREWING SYSTEM AND METHOD WITH BREW CYCLE CONTROL VALVE ARRANGEMENT

CROSS-REFERENCE TO RELATED APPLICATIONS

This application claims the benefit under 35 U.S.C. § 119(e) of U.S. Provisional Patent Application Ser. No. 62/460,858, filed Feb. 19, 2017 and entitled "AUTOMATED BEER-BREWING SYSTEM AND METHOD WITH BREW CYCLE CONTROL VALVE ARRANGEMENT", the disclosure of which is herein incorporated by reference.

TECHNICAL FIELD

The application concerns automated beer-brewing systems.

DETAILED DESCRIPTION

Figure 1:
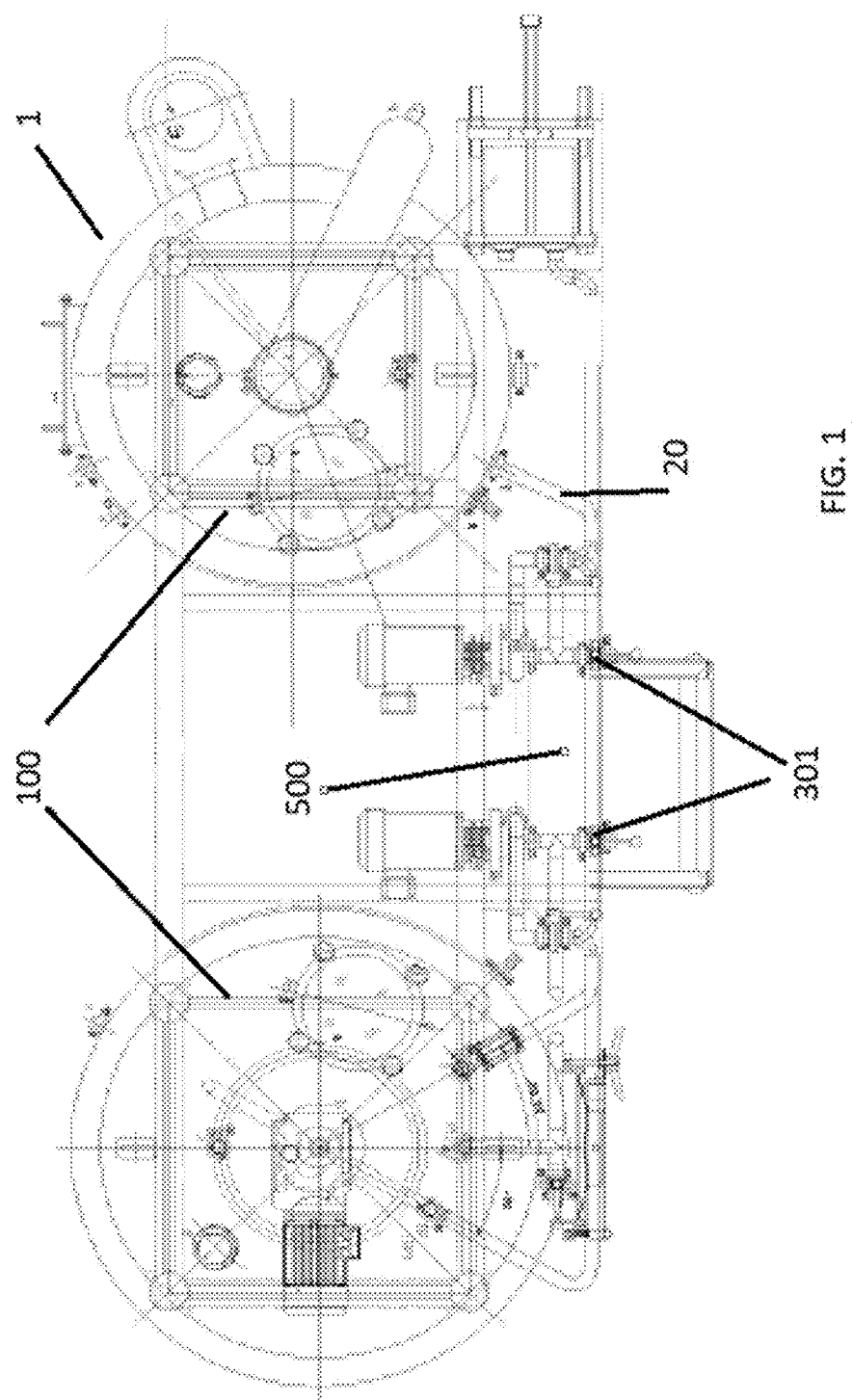
FIG. 1 is a top view of an automated beer brewing system.

An automated beer-brewing system 1 includes multiple brewing containers 100, also referred to as tanks, vessels or kettles, with pipes 20 coupled to the vessels and communicating with each container's 100 corresponding inner cavity. Certain pipes 20 are coupled to a top region 110 of the container 100 to allow for beer-brewing fluid ingredients to be added to the container 100. Other pipes are coupled to a bottom region 120 of the container 100 to allow for brewed beer, beer-brewing fluid ingredients, and waste fluids and solids to be dispensed from the container.

The automated system 1 includes multiple brewing containers 100 that have a generally vertical configuration, supply containers of beer-brewing fluid ingredients, and post-beer-brewing containers for use in ultimately bottling beer, or handling waste fluids and solids. Plural pipes 20 are coupled to top and bottom regions 110, 120 of each brewing container 100. The pipes 20 couple each brewing container 100 to: (i) one or more supply containers; (ii) one or more post-beer-brewing containers; or (iii) one or more other beer-brewing containers.

Referring collectively to FIGS. 1-9, one version of the automated beer brewing system 1 shows a version with two brewing containers 100, and corresponding pipes 20 connecting the containers 100 to each other and, by fragmentary illustration, to the supply and post-beer-brewing containers. The supply and post-beer-brewing containers are not shown in the Figures. Pipes 20 that lead to them are shown in fragmentary views with the pipe fragments showing connections to the beer brewing containers 100, and then extending from them without showing the remainder of the pipes that terminate into the supply or post-beer-brewing containers.

The Figures also show a central brew-control stand 500 with a brew-cycle control valve 301 arrangement 300. That stand 500 and arrangement 300 allows an operator 1000 (FIG. 2), to control the beer-brewing system 1 by manually operating brew-cycle control valves 301 that are coupled to each of the pipes 20. The operator 1000 can actuate the valves 301 from open to closed positions to allow fluid to flow through the corresponding pipe or to be prevented from flowing. This allows the operator 1000 to control operation of the beer-brewing system during a typical brew cycle.

FIGS. 1-9 show a beer-brewing system with two beer-brewing containers 100, but the system could involve any desired number of those containers, such as three, four or five of them. In addition, the brew-cycle control valve arrangement 300 is depicted with five valves 301 for each beer-brewing container 100, but could be designed for any desired number of control valves, such as three or four of them, or any desired number.

In conventional beer breweries, process control valves, i.e., valves that control the flow of fluids during the brewing process, are found in two basic configurations. A first one is in fully automated breweries, also called brewhouses, where there is a remote control interface located in a control room away from the beer-brewing containers. Fully automated systems are expensive and typically found on very large systems. A second one is in brewhouses that are either manual or partially automated. In those configurations, manual valves are located in multiple locations throughout the brewhouse, which requires the operator to move away from the various brewing tanks to actuate the valves.

Figure 2:
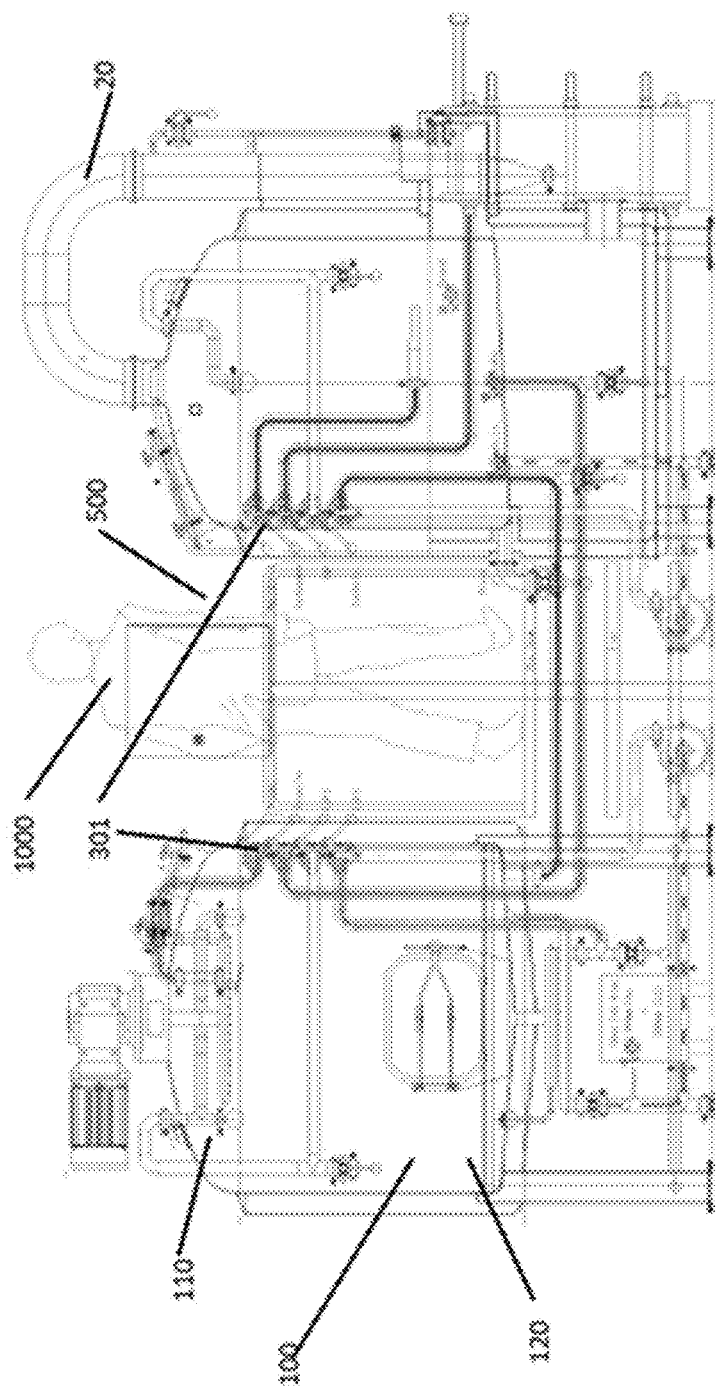
FIG. 2 is front view of the automated beer brewing system of FIG. 1, with an operator shown schematically in a position to control the valves associated with the system from one place upon a stand.
Figure 3:
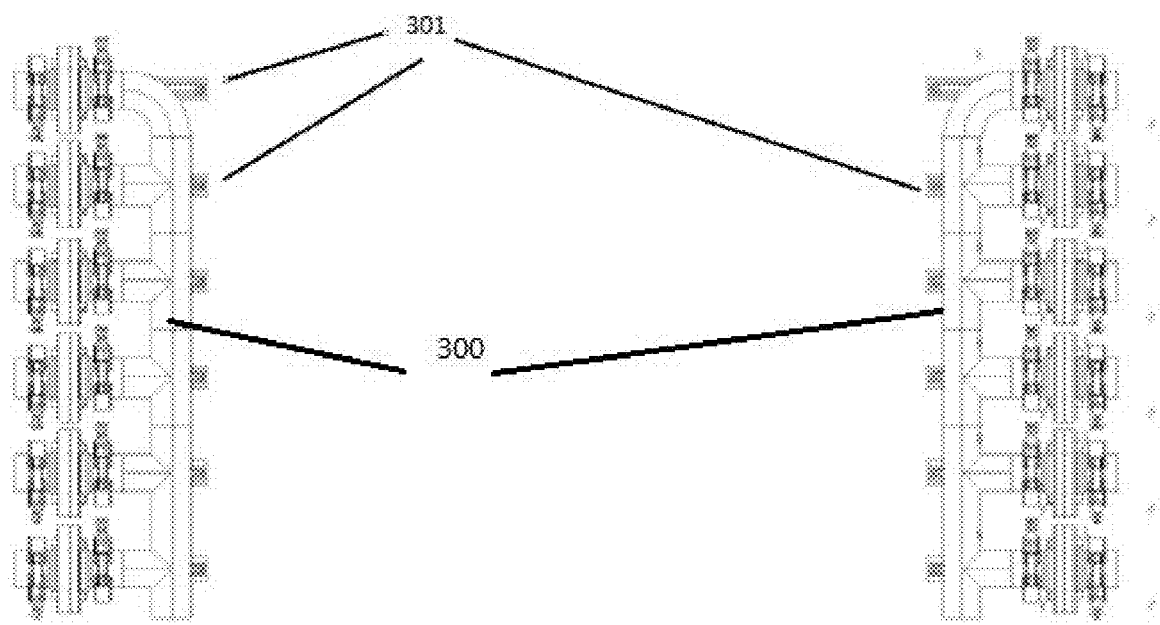
FIG. 3 is a front view of the brew-cycle control valve arrangements of the system of FIG. 1.
Figure 4:
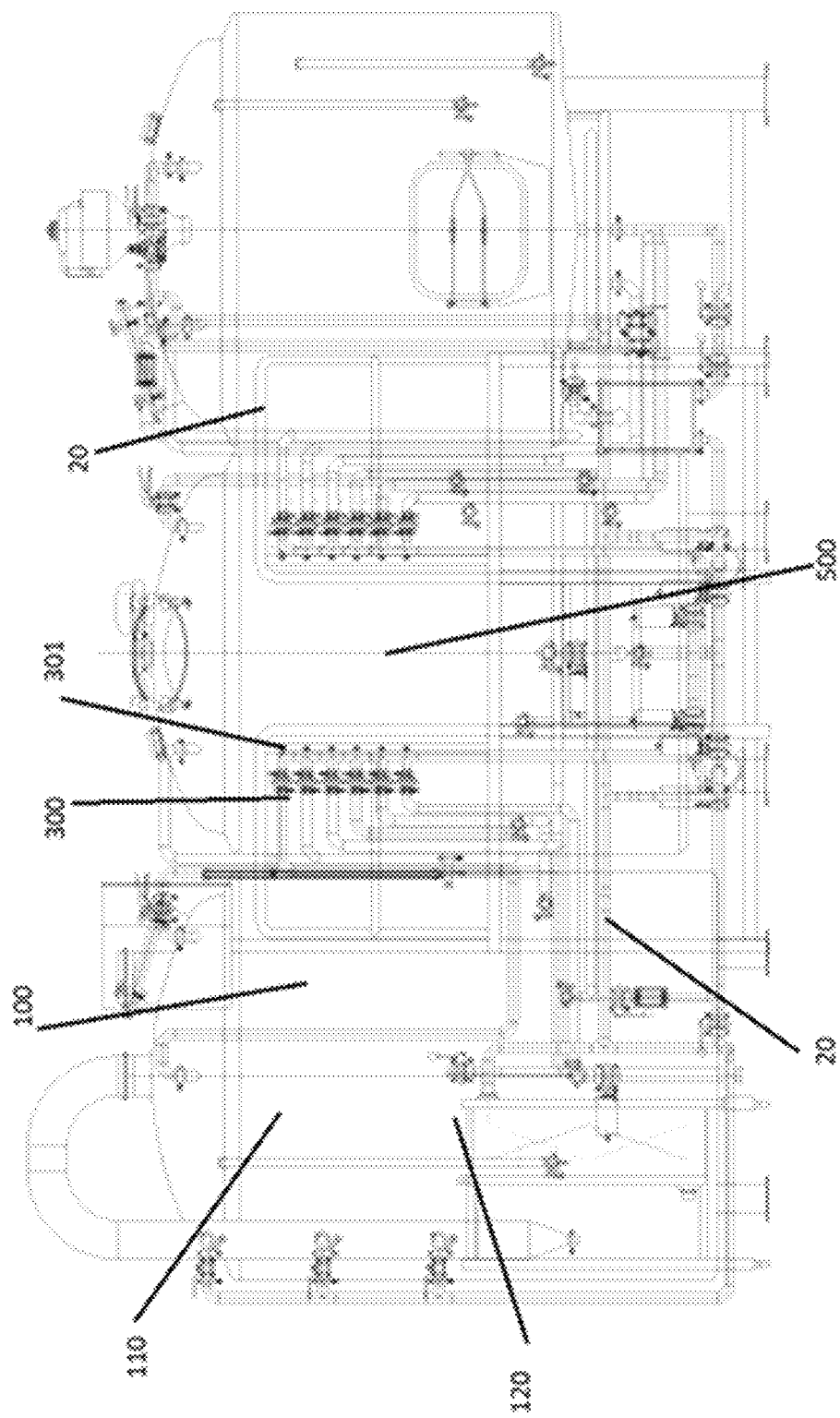
FIG. 4 is a front view showing the brew-cycle control valve arrangements disposed upon the system.
Figure 5:
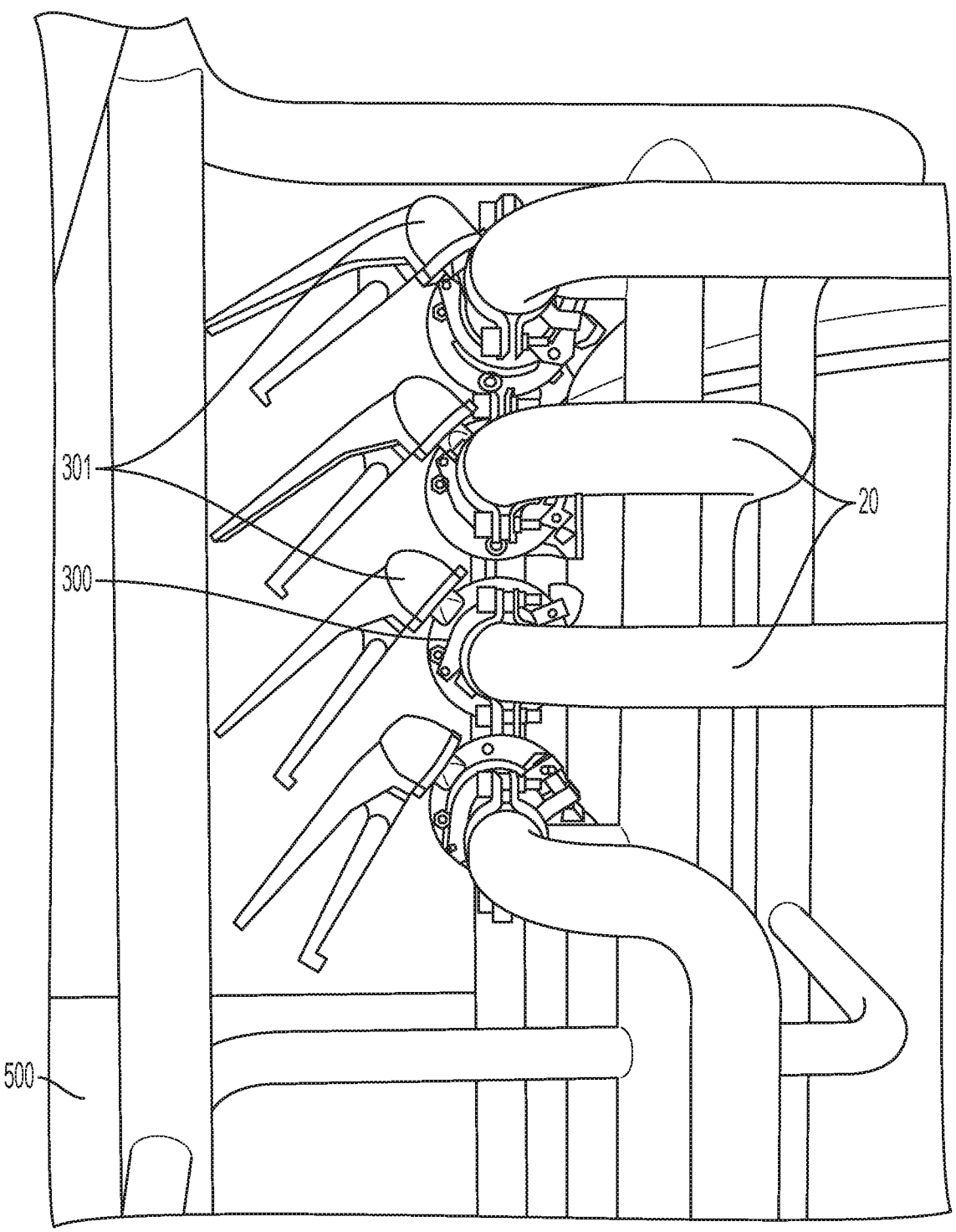
FIG. 5 is a front detail view of a first brew-cycle control valve arrangement.
Figure 6:
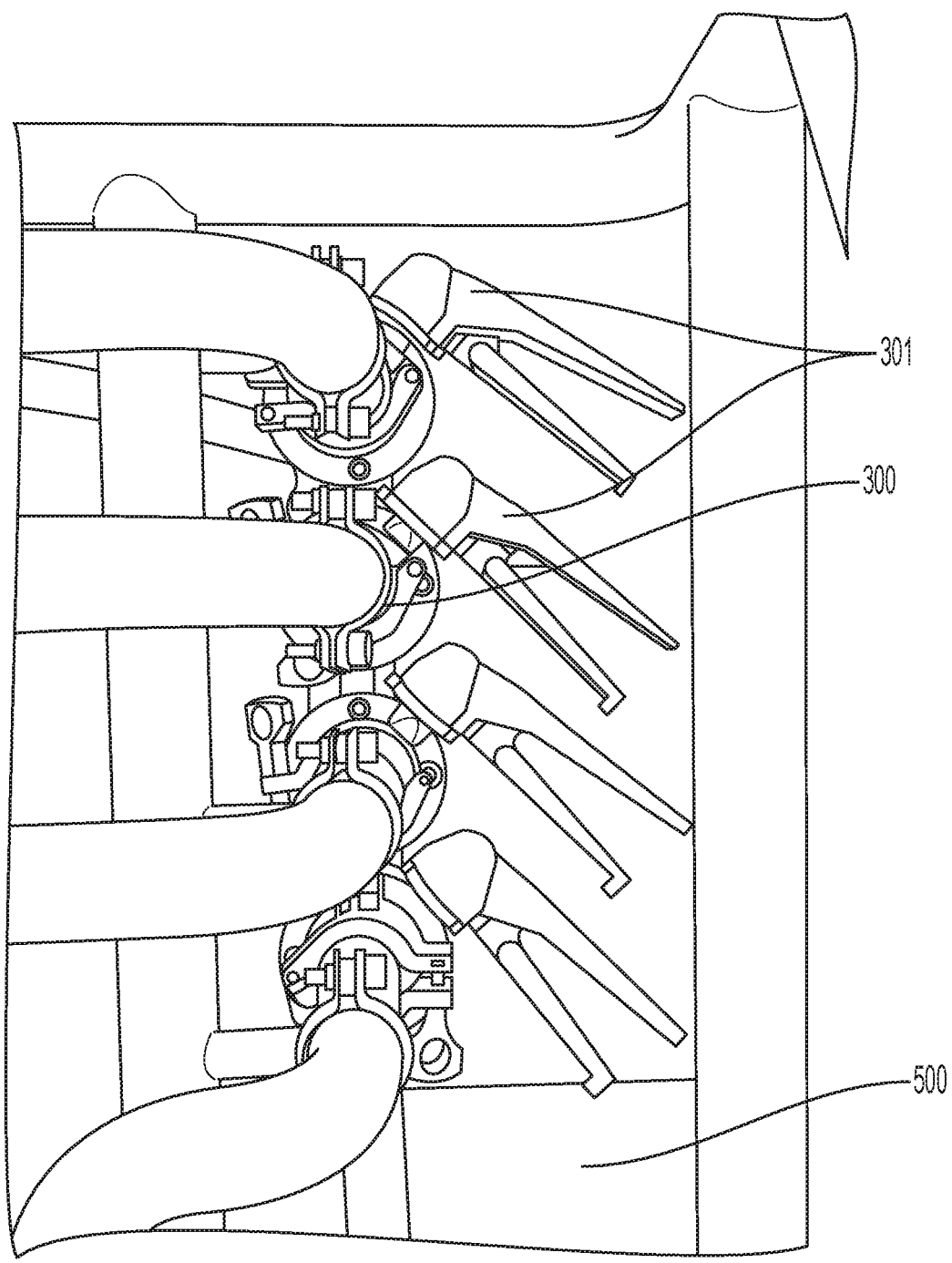
FIG. 6 is a front detail view of another brew-cycle control valve arrangement.
Figure 7:
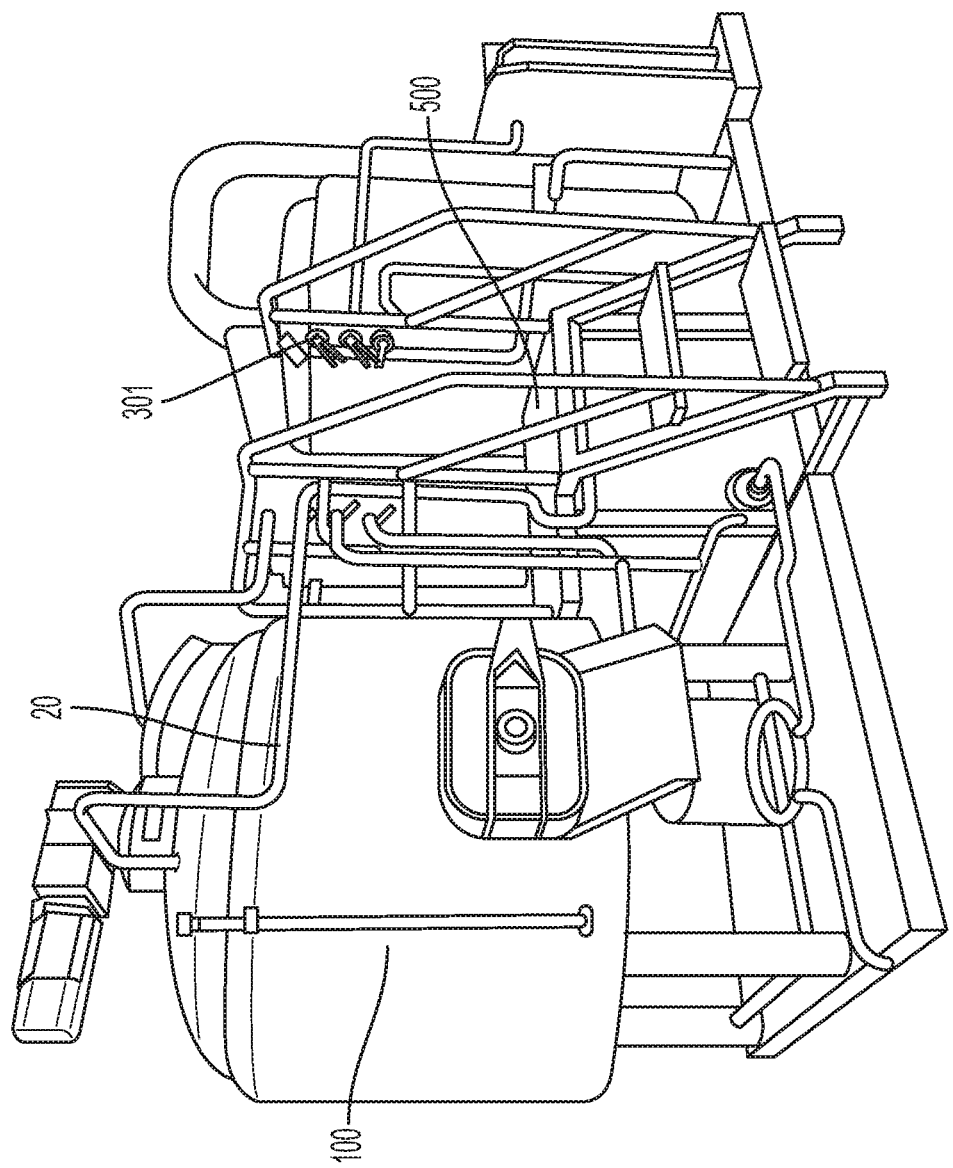
FIG. 7 is a perspective view of another automated beer brewing system.
Figure 8:
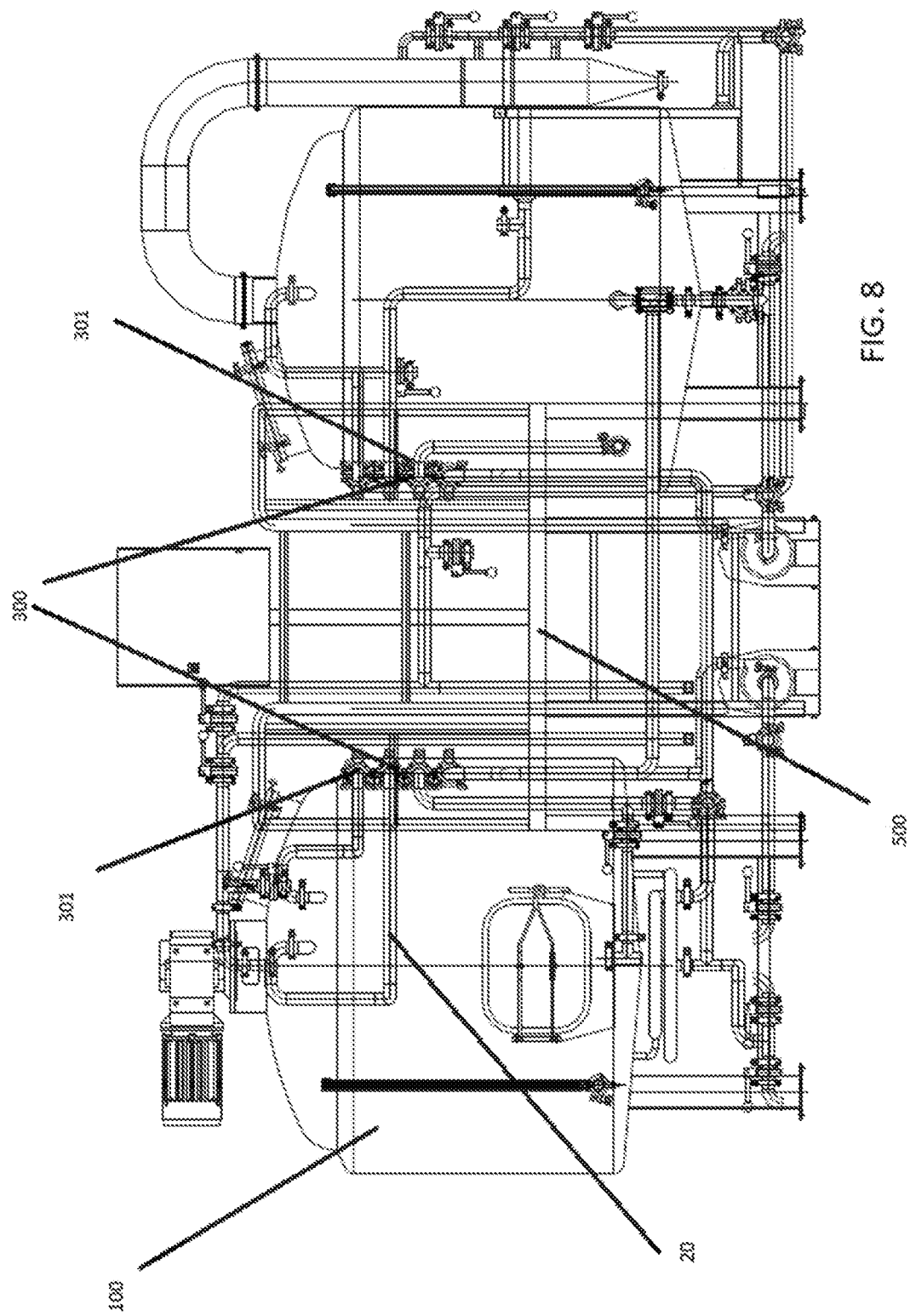
FIG. 8 is a front view of the system of FIG. 7.
Figure 9:
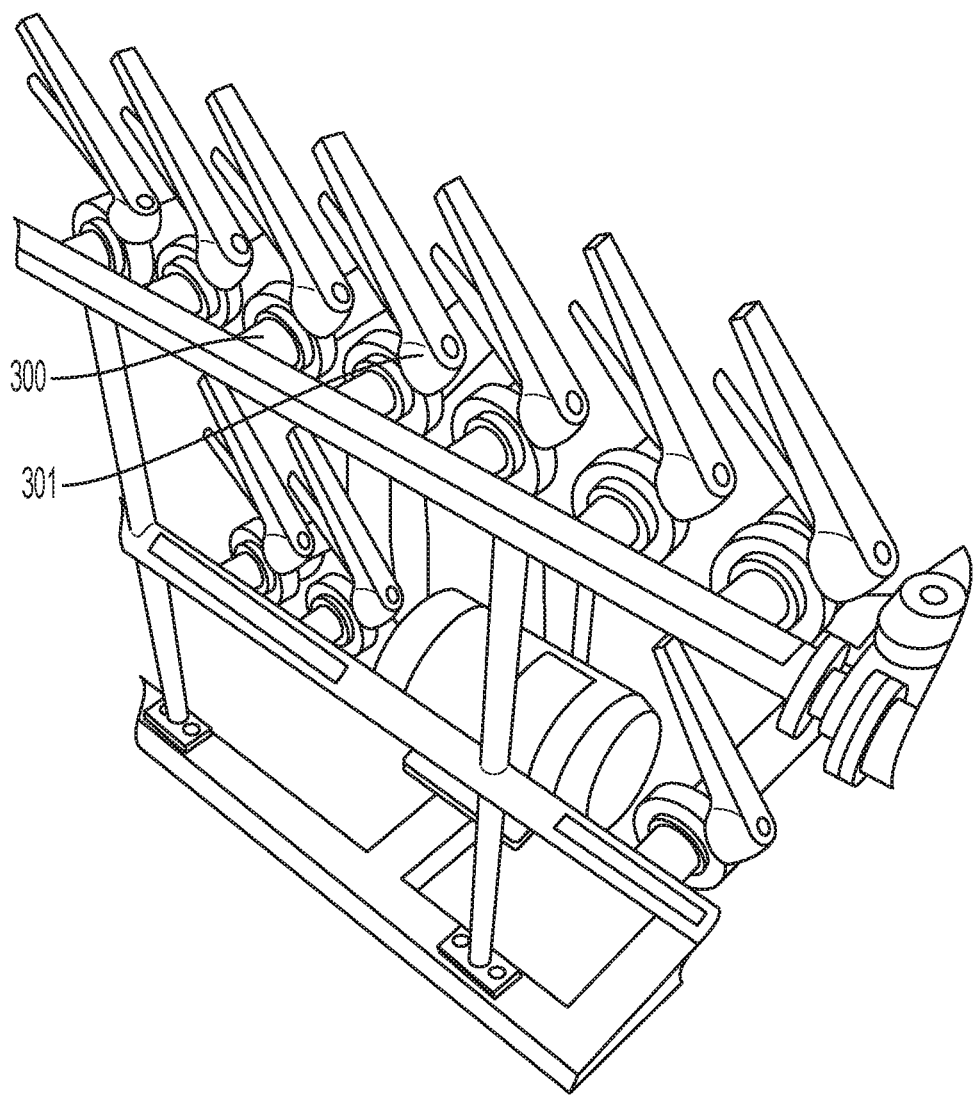
FIG. 9 is a detail view of a brew-cycle control valve arrangement.

The automated beer-brewing system 1 shown in the Figures and described above is not fully automated, but involves moving the control valves 301 to a central region, referred to herein as a brew-control stand 500, where an operator can control all brew-cycle control valves 301 from one place, as shown schematically in FIG. 2. This is important because of the dynamic nature of brewing where the brewer must be close to the brewing containers throughout the beer-brewing process.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

What is claimed:

1. An automated beer-brewing system, comprising:
plural brewing containers, each having a generally vertical configuration; one or more supply containers of beer-brewing fluid ingredients; one or more post-beer-brewing containers for use in bottling brewed beer and in handling waste fluids and solids, the plural brewing containers supported by a frame which is configured to rest on a surface;
plural pipes, coupled to top and bottom regions of each brewing container, with the pipes coupling each brewing container to one or more of the supply containers, one or more of the post-beer-brewing containers, and one or more other beer-brewing containers;
a central brew control stand that is fixed with respect to the frame;
plural brew-cycle control valves that are coupled to each of the plural pipes, wherein all of the brew-cycle control valves are located in a central region of the system and proximate to the central brew control stand;
wherein the central brew control stand is configured to be elevated above the surface when frame rests upon the surface;
the system further comprising one or more stairs that lead from the surface to the central brew control stand.

2. The automated beer-brewing system of claim 1, wherein the one or more supply containers of beer-brewing fluid ingredients and the one or more post-beer-brewing containers for use in bottling brewed beer and in handling waste fluids and solids are supported by the frame.

3. A method for automating a beer brewing process, comprising:
providing the automated beer-brewing system of claim 1; and
operating all of the brew-cycle control valves from upon the central brew control stand.

4. An automated beer-brewing system, comprising:
plural brewing containers, each having a generally vertical configuration; one or more supply containers of beer-brewing fluid ingredients; one or more post-beer-brewing containers for use in bottling brewed beer and in handling waste fluids and solids, the brewing container, the supply containers, and the post-beer-brewing containers supported by a frame, the frame configured to rest upon a surface;
a plurality of pipes, the plurality of pipes coupling each of the plurality of brewing containers to (1) one or more of the one or more supply containers, (2) one or more of the one or more post-beer-brewing containers, or (3) one or more other beer-brewing container;
a portion of the plurality of pipes coupled to a top region of the respective plural brewing containers, and another portion of the plurality of pipes coupled to a bottom portion of the plural brewing containers;
a central brew control stand that is fixed with respect to the frame;
plural brew-cycle control valves that are coupled to each of the plurality of pipes, wherein all of the brew-cycle control valves are located in a central region of the system and proximate to the central brew control stand;
wherein the central brew control stand is configured to be elevated above the surface wherein the frame rests upon the surface;
the system further comprising one or more stairs that lead from the surface to the central brew control stand.

* * * * *